N. L. LIEBERMAN.
TROLLEY WHEEL.
APPLICATION FILED JAN. 25, 1921.

1,428,644.

Patented Sept. 12, 1922.

Inventor
NATHAN L. LIEBERMAN,
By his Attorney

Patented Sept. 12, 1922.

1,428,644

UNITED STATES PATENT OFFICE.

NATHAN L. LIEBERMAN, OF BAYONNE, NEW JERSEY.

TROLLEY WHEEL.

Application filed January 25, 1921. Serial No. 439,773.

*To all whom it may concern:*

Be it known that I, NATHAN L. LIEBERMAN, a citizen of the United States, residing at Bayonne, in the county of Hudson and State of New Jersey, have invented certain new and useful Improvements in Trolley Wheels, of which the following is a specification.

My invention relates to trolley wheels and is concerned more particularly with the lubrication thereof.

The invention is characterized in that a plural number of lubricant reservoirs are provided.

From each reservoir the lubricant is simultaneously fed to an annular passageway or channel formed in the trolley wheel hub. Such channel or annular passageway is adapted to encircle a bushing forced into the hub opening of the trolley wheel, the bushing, by reason of its tight fit, sealing the channel and directing the lubricant at all times and under all operating conditions to the one properly proportioned discharge outlet or opening. The said discharge outlet is preferably restricted at its discharge terminal or end, and regardless of the position of the bushing relatively to the wheel, at all times registers with the annular groove or channel. The use of a plural number of reservoirs, and the simultaneous feeding of the lubricant contained therein to the annular passageway common to all of the several reservoirs, together with the provision of but the one restricted discharge opening formed in the bushing, and through which the lubricant is discharged, I consider the prime desideratum of the invention evolved by me. Other constructional details however will be hereinafter disclosed and the invention defined in the subjoined claims.

In the drawings wherein like reference numerals denote like or similar parts:

Figure 1:
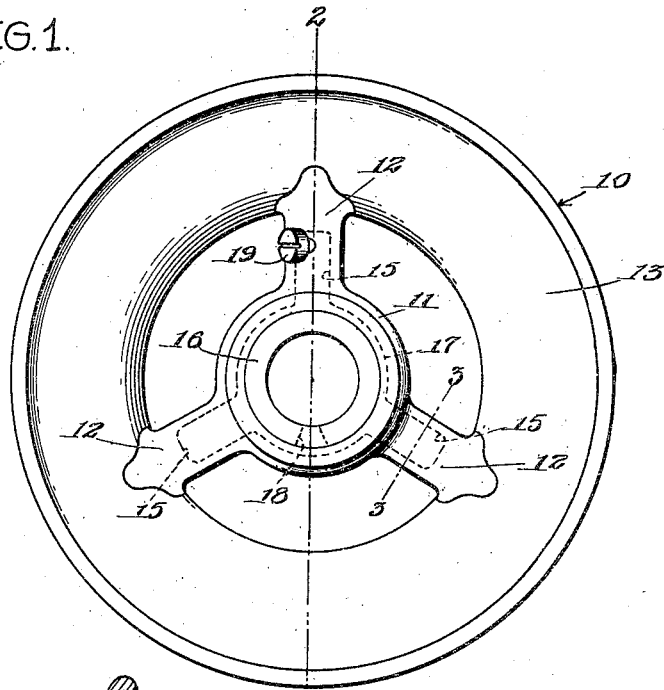
Fig. 1 is a face view of my improved trolley wheel lubrication system showing the path of flow of lubricant and also the relative arrangement of the several reservoirs and passageways.

In the embodiment of my invention selected for illustration the trolley wheel is designated in its entirety as 10. It comprises the usual hub portion 11, radial spokes 12 and outer rim 13, the latter having the usual peripheral groove 14 formed therein to receive the trolley wire (not shown). Within each of the several spokes of the wheel a lubricant reservoir 15 is formed, each reservoir (see Fig. 1) at one end being tightly sealed by a suitable bushing 16 designed to snugly fit the center opening with which the hub portion 11 of the wheel is provided. Within the hub portion of the wheel, and likewise sealed by the bushing, an annular groove or passageway 17 is formed. This groove 17 provides an oil duct or passageway between adjacent reservoirs and allows the lubricant to flow freely around the bushing.

Figure 2:
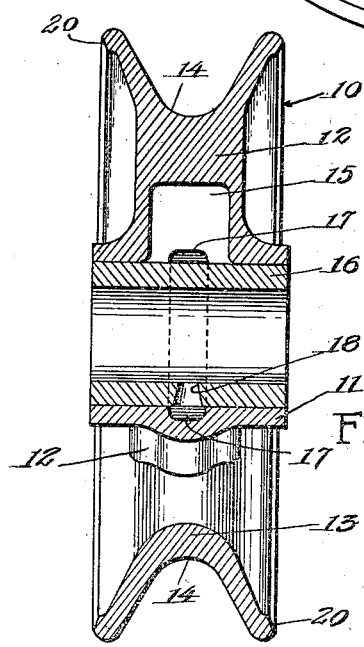
Fig. 2 is a section on the line 2—2 of Fig. 1.
Figure 3:
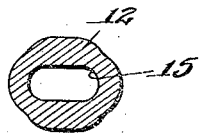
Fig. 3 is a section of the line 3—3 of Fig. 1.

To provide for the discharge of the lubricant contained in the annular passageway onto the axle, an opening or discharge outlet 18 is formed in the bushing. This opening 18 (see Fig. 2) is restricted, and in practise, the area of the outlet terminal or restricted mouth is such as to insure adequate lubrication without permitting over-lubrication under all operating conditions. A suitable screw 19 or other sealing device is used to close one or more openings in the spokes through which the lubricant is forced in filling the reservoirs and interconnecting passageways.

While I have described my invention in detail in its present preferred embodiment, it will be understood by those skilled in the art that various changes and modifications can be made therein without departing from the spirit or scope thereof. I aim in the appended claims to cover all such modifications and changes.

What is claimed is:

1. In a lubrication system for trolley wheels, the combination with the wheel and axle, of a plurality of lubricant reservoirs formed one in each of the several spokes of the wheel, each reservoir being open to an annular outlet passageway common to the several reservoirs, the outlet passageway being formed in the hub of the wheel; the relation of the annular passageway to the axle being such that the lubricant contained in the reservoirs is continuously fed to the axle under all operating conditions.

2. In a lubrication system for trolley wheels, the combination with the wheel and axle, of a bushing having an opening formed therein, and a lubricant reservoir formed in one of the spokes of the wheel, the reservoir being provided with an annular outlet passageway formed in the hub of the wheel to encircle the bushing, the relation of the annular passageway to the opening formed in the bushing being such that the lubricant fed to the annular passageway enters the opening and is fed to the axle under all operating conditions.

In testimony whereof I hereunto affix my signature.

NATHAN L. LIEBERMAN.